April 26, 1949.   A. RUSS   2,468,113
GYRO ERECTING MEANS
Filed May 31, 1945   2 Sheets-Sheet 1

INVENTOR.
ALEXANDER RUSS.
BY Ralph L Chappell
ATTORNEY

April 26, 1949.                A. RUSS                    2,468,113
                           GYRO ERECTING MEANS
Filed May 31, 1945                                    2 Sheets-Sheet 2
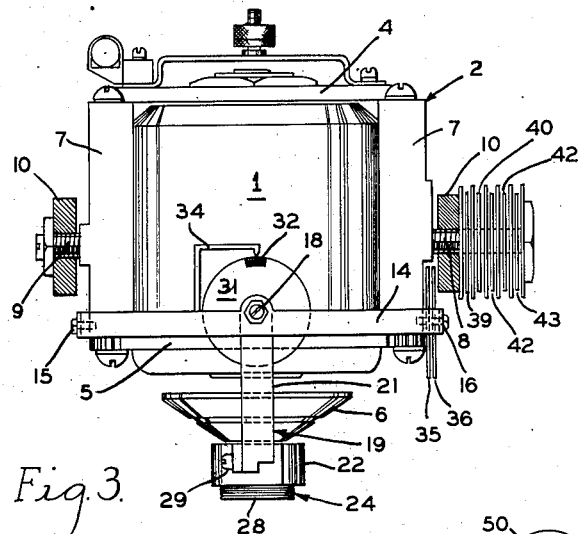
Fig. 3.
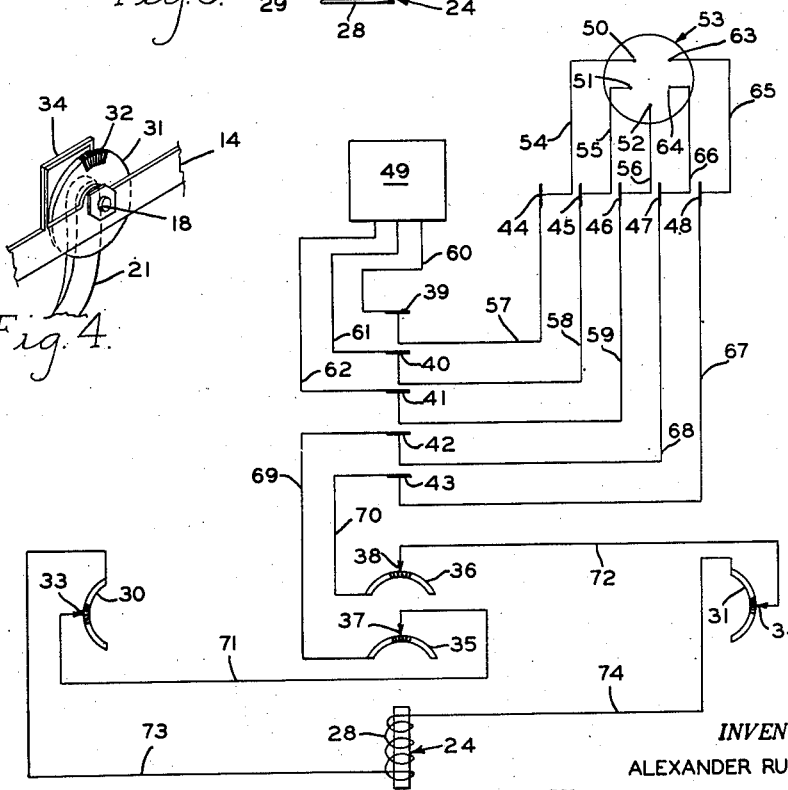
Fig. 4.
Fig. 5.
INVENTOR.
ALEXANDER RUSS
BY
Ralph L Chappell
ATTORNEY Patented Apr. 26, 1949

2,468,113

UNITED STATES PATENT OFFICE 2,468,113

GYRO ERECTING MEANS

Alexander Russ, Philadelphia, Pa.

Application May 31, 1945, Serial No. 596,946

11 Claims. (Cl. 74—5.46)

(Granted under the act of March 3, 1883, as amended April 30, 1928; 370 O. G. 757)

This invention relates to new and useful improvements in gyroscopic devices, and more particularly to erecting means for gyroscopic devices of the type, for example, adapted to indicate the true vertical so as to provide an artificial horizon indication on moving vehicles such as aircraft.

In the flight of a plane carrying a gyroscopic device of the stated type, the plane itself pitches, rolls and yaws about the gyro rotor, and the spin axis of the rotor does not change direction with changes in the direction of the axes of the plane. In horizon-type instruments, the sensitive element of the device is the gyro which actuates the indicating bar or pointer of the instrument. However, due to frictional and various unbalance forces in the instrument, the spin axis of the gyro rotor will precess off from the normal, or true vertical position. This condition requires that such gyroscopic devices be provided with an erecting mechanism to "erect" the rotor spin axis into the true vertical position.

Gyroscopic devices of the stated type in many cases are provided with an erection mechanism comprising a pendulum that is constructed and arranged to remain in the true average gravitational position independently of the direction of the gyro rotor spin axis. Generally this pendulum is provided with a small permanent magnet that is positioned in the pendulum so that its axis is disposed coaxially of the spin axis of the rotor when the latter is in the true vertical position. The reaction of this permanent magnet upon a portion of the gyro rotor causes the spin axis of the latter to assume the true vertical or erect position after it has been displaced therefrom under the influence of friction and unbalance forces in the instrument.

These permanent magnets associated with the pendulums of gyro devices are relatively weak so that the rotor spin axis does not follow every small movement of the pendulum as the latter is displaced from the true vertical under the influence of acceleration forces, and hence error in the indication afforded by the gyro, is maintained at a minimum. However, by reason of the comparatively weak erecting forces thus produced, friction, unbalance and other structural conditions existing in the gyro in most cases produce an error in the position of the rotor spin axis when erected of from about 2° to 3° from the true vertical depending upon the direction and extent of original displacement therefrom of the spin axis of the rotor. Thus there exists in gyro devices of the present type the problem and difficulty of providing means for accurately erecting the rotor spin axis into the true vertical position, while at the same time reducing the effect of the pendulum upon the rotor spin axis as the said pendulum is displaced from the true vertical under the influence of acceleration forces.

With the foregoing in mind, the principal object of the present invention is to provide a gyro device having a novel erecting mechanism operable to position the spin axis of the rotor accurately in the true vertical position.

Another object of the invention is to provide a gyro device of the stated character having novel erecting means that is positive and accurate in operation and which reduces the effect of the erecting means upon the gyro rotor as the former is displaced from the true vertical in response to acceleration forces acting thereon.

A further object of the invention is to provide a gyro device having a novel erecting mechanism as set forth which is of relatively simplified and inexpensive construction, efficient and fool-proof in operation, and which may be readily installed or applied to existing gyro devices as well as in the course of manufacture thereof.

These and other objects of the invention, and the various features and details of the construction and operation thereof, are hereinafter fully set forth and described with reference to the accompanying drawing, in which:

Fig. 3 is a view taken on line 3—3, Fig. 1.

Fig. 4 is a fragmentary perspective view of certain components of a gyro embodying the present invention; and Fig. 5 is a schematic wiring diagram of an electrical circuit for a gyro embodying the present invention.

Figure 1:
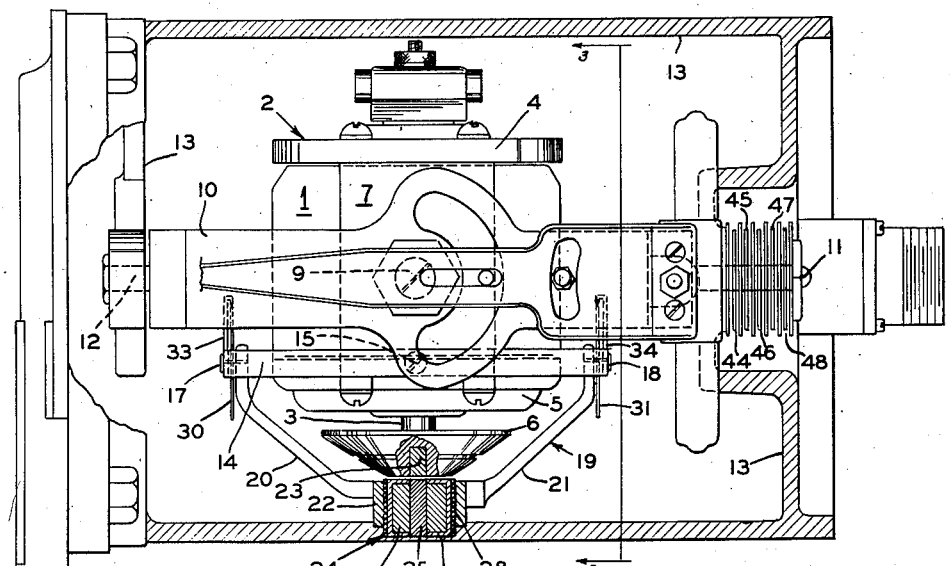
Fig. 1 is a side elevational view partially in section of a gyro device embodying the present invention.
Figure 2:
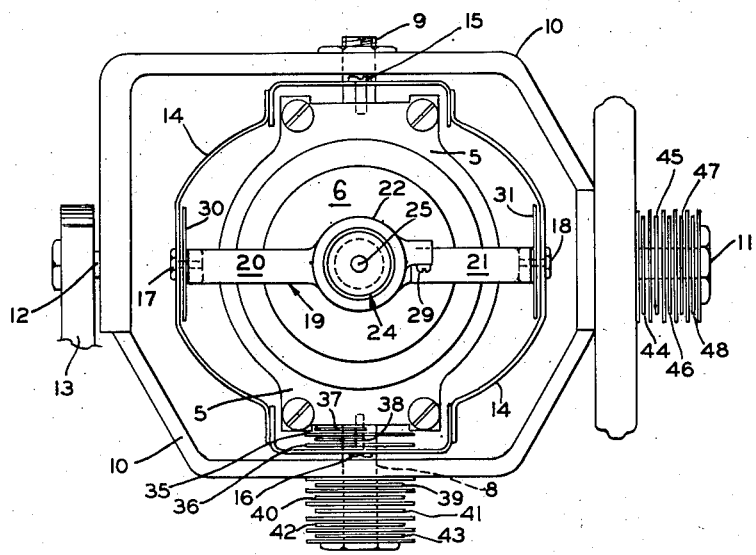
Fig. 2 is a view from the underside of the device of Fig. 1 showing only the rotor and its supporting structure.

Referring now to the drawing, and more particularly to Figs. 1, 2 and 3 thereof, reference numeral 1 designates a rotor that is mounted within a frame structure, generally designated as 2, for rotation about a normally vertical axis. The rotor 1 has a shaft 3 coaxially thereof and the upper end of said shaft is journaled in the top portion 4 of said frame 2 while the lower portion of said shaft is journaled in the bottom portion 5 thereof. The lower end of the shaft 3 extends below the bottom frame portion 5 and has secured on the end thereof, for rotation therewith, a metallic non-magnetic member 6 of substantially inverted conical shape. The rotor 1, its shaft 3 and the member 6 are rotationally driven about their common spin axis at high speed by means of suitable motive power, and, in the illustrated embodiment of the invention, the rotor 1 constitutes the rotor element of a three phase electric motor.

The frame structure 2, in which the rotor 1 is mounted as described, is pivoted centrally of its side portions 7 for angular movement about a normally horizontal axis upon trunnions or shafts 8 and 9 arranged in coaxial alignment in the opposite side portions of a gimbal ring 10. The gimbal ring 10, in turn, is pivoted for angular movement about a second normally horizontal axis, perpendicular to the first axis, upon trunnions or shafts 11 and 12, which are journaled in opposite end portions of a fixed support structure 13. A second gimbal suspension comprising a gimbal ring 14 is pivoted for angular movement about a normally horizontal axis formed by trunnions or shafts 15 and 16 carried by the opposite side members 7 of the frame structure 2, and it is to be noted that the gimbal ring 14 thus is pivoted for angular movement about an axis that is parallel to the axis of angular movement of the rotor 1 and frame 2 with respect to the first mentioned gimbal ring 10.

Pivotally suspended from the second gimbal ring 14 by means of trunnions or shafts 17 and 18 carried thereby and positioned 90°, respectively, from the trunnions or shafts 15 and 16 is a gravity pendulum structure 19 comprising arcuate arm portions 20 and 21 that curve downwardly from said trunnions 17 and 18, respectively, and terminate in a central annular collar portion 22. It is to be noted that trunnions 17 and 18 are positioned so that angular movement of the pendulum structure 19 takes place about an axis that is perpendicular to the axis of angular movement of said gimbal ring 14. The pendulum 19 thus is freely suspended with respect to the rotor 1 and its gimbal suspension 10, with the result that the pendulum will, as the result of the action of gravity thereon, remain in a position in which the axis of the central annular collar portion 22 is disposed in the true average vertical position independently of the position of the spin axis of the rotor 1 and its supporting gimbal 10.

In accordance with the present invention there is secured coaxially within the counterweight member 6 a cylindrical core member 23 of magnetic material such as, for example, iron, steel or the like. In addition to this core member 23 that is provided in the member 6, there is provided and secured in the collar portion 22 of the pendulum 19 suitable gyro erecting means comprising an electro-magnet 24 and a permanent magnet 25. The electro-magnet 24 comprises an annular core member 26, for example, of soft iron or other magnetic material, provided with an outer sheathing 27 circumferentially of which is arranged a coil 28 comprising a plurality of turns of wire. The permanent magnet 25 of this assembly is mounted within the annular core member 26 of the electro-magnet 24 so that the former is coaxially disposed with respect to the latter and coil 28. The assembly may be removably secured in the collar portion 22 of the pendulum 19 by any suitable means such as, for example, a set screw 29. It is to be noted that the construction and arrangement of this magnet assembly is such that both the permanent magnet 25 and the electro-magnet 24 are arranged so that their magnetic fields are additive and so that the magnetic field of the electro-magnet 24 is the stronger of the two.

According to the present invention, the electro-magnet 24 is adapted to be energized only at such times as the angular displacement of the spin axis of the rotor, about either of its axes of rotation, is within range of about, for example, an angle of 2° from the true vertical. To this end there is secured to the pivoted end portions of the arms 20 and 21 of the pendulum structure 19 for rotation therewith coaxially with respect to the axis of the trunnion, disc elements 30 and 31, respectively. These disc elements 30 and 31 are fabricated of electrically nonconducting material, and secured to said discs 30 and 31 for rotation therewith are segmental contact elements such as indicated at 32 in Fig. 4 of the drawing, having an arcuate length, for example, of about 4°. These segmental contacts 32 are positioned circumferentially of the discs 30 and 31 so that the radii of the latter through the midpoint of said segmental contacts reside in the true vertical position in which the pendulum structure 19 is on the average disposed.

Arranged for contact with the segmental contacts of discs 30 and 31 are fixed contact elements such as indicated at 33 and 34 (see Fig. 4) that are carried by gimbal ring 14 from which the pendulum structure 19 is suspended, and these fixed contacts 33 and 34 are positioned with respect to the gimbal ring 14 and the discs 30 and 31 so as to engage the segmental contacts thereon only at such time as the angular displacement of the spin axis of the rotor 1 from the true vertical is such that displacement of the gimbal ring 14 relative to the pendulum 19 is within the range, for example, of 2°, in either direction, from the normally perpendicular relationship of the ring 14 and the pendulum 19 with respect to one another.

In a similar manner there is secured to one side 7 of the frame structure 2, for rotation therewith coaxially with respect to the frame trunnion 8 a pair of disc elements 35 and 36, respectively. In like manner, these disc elements 35 and 36 are fabricated of electrically non-conducting material, and secured to each thereof, for rotation therewith, is a segmental contact such as the contact 32 (see Fig. 4) hereinbefore described. These segmental contacts are positioned circumferentially of the discs 35 and 36 so that the radii of the latter through the midpoint of the arcuate length of said contacts is disposed at all times parallel to the spin axis of the rotor 1, and hence will be disposed in the true vertical position when the rotor spin axis is in that position.

Similarly arranged for contact with the segmental contacts of the discs 35 and 36 are fixed contacts 37 and 38, respectively, that are carried by the rotor gimbal ring 10. These fixed contacts 37 and 38 are positioned with respect to the discs 35 and 36, respectively, so as to engage the segmental contacts thereon only at such time as the angular displacement of the spin axis of the rotor 1 is within the range of, for example, 2°, in either direction, from its normal position perpendicular with respect to the normally horizontal axis of rotation of the rotor with respect to its supporting gimbal ring 10.

For the purpose of providing the necessary electrical connections to a gyroscopic device made in accordance with the present invention, there is associated in the conventional manner with the trunnion 8 in a group or series of five sets of slip rings, 39, 40, 41, 42 and 43, respectively, and similarly associated with the trunnion 11 pivotally supporting rotor gimbal ring 10 and rotor 1 is a second group of five sets of slip rings, 44, 45, 46, 47 and 48, respectively. The construction and arrangement of the sets of slip rings of each of these groups is such that they remain continuously in electrical contact or closed circuit relation, irrespective of the angular position of the axis of the rotor assembly with respect to the stationary frame structure of the gyroscopic device.

In Fig. 5 of the drawing there is diagrammatically illustrated a suitable electric circuit for a gyroscope device embodying the present invention. Referring to said Fig. 5, the three-phase motor of which the rotor 1 constitutes the rotor is designated generally by reference numeral 49 and current is supplied to said motor 49 from the terminals 50, 51 and 52, of a conventional five prong plug type connector 53, through conductors 54, 55 and 56, slip rings 44, 45 and 46, conductors 57, 58 and 59, slip rings 39, 40 and 41, and conductors 60, 61 and 62.

In addition to the motor 49, current likewise is supplied to the electro-magnet device 24, within the limited range of angular displacement of the rotor spin axis from the true vertical position hereinbefore described, from plug connector terminals 63 and 64 through conductors 65 and 66, slip rings 47 and 48, conductors 67 and 68, slip rings 42 and 43 and conductors 69 and 70 that lead to the segmental contacts on the discs 35 and 36, respectively. From the fixed contacts 37 and 38 cooperable with the segmental contacts on said discs 35 and 36, respectively, for cooperative engagement with the segmental contacts on discs 30 and 31, and from the segmental contacts on discs 30 and 31, conductors 73 and 74 lead to the terminals of the coil 28 of the electro-magnet 24.

From the foregoing description of the gyro electric circuit and the construction and arrangement of the several segmental contacts on discs 30, 31, 35 and 36 and the fixed contacts 33, 34, 37 and 38 arranged for cooperative engagement therewith, it will be apparent that no current will flow to the coil 28 of the electro-magnet 24 unless all of the said fixed contact elements are in engagement with the associated segmental contacts on all of said discs. Furthermore, it will be apparent from the foregoing description that the construction and arrangement of the several segmental contacts and their associated fixed contacts is such that all of the fixed contacts 33, 34, 37 and 38 will be in engagement with the movable segmental contacts on said discs 30, 31, 35 and 36 only at such time as the angular displacement of the spin axis of the rotor 1 does not exceed or is within the range of, for example, 2° in any direction from the true vertical or erect position thereof, and that when the rotor spin axis is angularly displaced in any direction from the true vertical or erect position, more than say 2°, the circuit to the coil 28 of the electro-magnet 24 will be broken or interrupted and the latter de-energized.

In operation of a gyro device embodying the present invention and assuming, for example, that due to extreme forces the spin axis of the rotor 1 is angularly displaced, say 30° from the true vertical position, the reaction of the permanent magnet 25 upon the member 6 will cause the rotor 1 slowly to return to the vertical position and, it will be apparent that when the spin axis of the rotor has returned to within, for example, 2° of the true vertical position thereof, the several disc elements 30, 31, 35 and 36 with their segmental contacts will have rotated relative to the fixed contacts 33, 34, 37 and 38 so as to bring all of the segmental contacts on said discs 30, 31, 35 and 36 into engagement with said fixed contacts 33, 34, 37 and 38 to thereby complete the eletcric circuit to the coil 28 of the electro-magnet 24 with the result that the latter is energized. Energization of the electro-magnet 24 in this manner sets up a magnetic field that in addition to the weaker field of the permanent magnet 25, exerts upon the magnetic core member 23 disposed coaxially within the counter weight member 6 of the rotor assembly a substantial attractive force which, since the common axis of the permanent magnet member 25 and of the electro-magnet 24 is disposed in the true vertical position, functions to erect the spin axis of the rotor 1 accurately into the true vertical position.

On the other hand, let us suppose that the pendulum 19 is largely displaced from the true vertical position. As the pendulum is displaced more than, for example, 2° from the true vertical position, the several disc elements 30, 31, 35 and 36 will have rotated relative to their fixed contacts 33, 34, 37 and 38 so as to remove all of the latter from engagement with their segmental contacts to thereby break the circuit to the electro-magnet 24 and de-energize the latter. De-energization of the electro-magnet 24 minimizes the effect of the pendulum 19 upon the member 6 of the rotor assembly thereby permitting the latter to remain in the true vertical position independently of large angular displacement of the pendulum.

From the foregoing it will be observed that the present invention provides a novel erecting means for gyro devices that is operable to position the spin axis of the rotor accurately in the true vertical position while reducing the effect of the erecting means upon the rotor 1 as said erecting means is displaced in response to the action of the acceleration forces thereon. The invention further provides an effective and accurate gyro erecting means which is of relatively simplified and inexpensive construction, efficient and fool-proof in operation, and which may be readily installed or applied to existing gyro devices as well as to those in the course of manufacture.

While a particular embodiment of the present invention has been illustrated and described, it is not intended that the invention be limited to such disclosure, and changes and modifications may be made therein and thereof within the scope of the claims.

The invention described herein may be manufactured and used by or for the Government of the United States of America for governmental purposes without the payment of any royalties thereon or therefor.

I claim:

1. In a gyro device of the character described, a rotor assembly having a normally vertical spin axis and mounted for angular movement about two mutually perpendicular horizontal axes at right angles to said rotor spin axis, a member pivotally mounted with respect to the rotor assembly and arranged for disposition in the true vertical position independently of the position of the rotor spin axis, a magnetic core element carried by the rotor assembly and arranged coaxially of the spin axis of the rotor, energizable means carried by said member cooperable with said element and arranged so that the axis thereof is disposed coaxially of the rotor spin axis when the latter is in the true vertical position, and means to energize said energizable means controlled by said pivotally mounted member only when the rotor spin axis is within a predetermined range of angular displacement with respect to the true vertical position thereof.

2. In a gyro device of the character described, a rotor assembly having a normally vertical spin axis and mounted for angular movement about two mutually perpendicular horizontal axes at right angles to the rotor spin axis, a member pivotally mounted with respect to the rotor assembly and arranged for disposition in the true vertical position independently of the position of the rotor spin axis, a magnetic core element associated with the rotor assembly and arranged coaxially with the rotor assembly and arranged coaxially of the spin axis of the rotor, energizable means carried by said member cooperable with said core element and arranged so that the axis thereof is disposed coaxially of the rotor spin axis when the latter is in the true vertical position, an electric circuit including said energizable means, and contact elements in said circuit arranged for cooperative engagement only when the spin axis of the rotor is within a predetermined limited range of angular displacement from the true vertical position to thereby close said circuit and energize said energizable means to erect said rotor assembly accurately into the true vertical position.

3. In a gyro device of the character described, a rotor assembly having a normally vertical spin axis and mounted for angular movement about two mutually perpendicular horizontal axes at right angles to the rotor spin axis, a member pivotally mounted with respect to said rotor assembly and arranged for disposition in the true vertical position independently of the position of the rotor spin axis, a magnetic core element associated with the rotor assembly and arranged coaxially of the spin axis of the rotor, erecting means cooperable with said core element including coaxially disposed permanent and electro-magnetic devices carried by said member and arranged so that the common axis of said magnet device is disposed coaxially of the rotor spin axis when the latter is in the true vertical position, said electro-magnet device when energized exerting a substantially stronger attractive force on said core element than said permanent magnet, an electric circuit including said electro-magnet device, and contact elements in said circuit arranged for cooperative engagement only when the spin axis of the rotor is within a predetermined limited range of angular displacement from the true vertical position to thereby close said circuit and energize said electro-magnet to erect said rotor assembly accurately into the true vertical position.

4. In a gyro device of the character described, a rotor assembly having a normally vertical spin axis and mounted for angular movement about two mutually perpendicular horizontal axes at right angles to the rotor spin axis, a member pivotally mounted with respect to the rotor assembly and arranged for disposition in the true vertical position independently of the position of the rotor spin axis, a magnetic core element associated with the rotor assembly and arranged coaxially of the spin axis of the rotor, energizable means carried by said member cooperable with said core element and arranged so that the axis of said energizable means is disposed coaxially of the rotor spin axis when the latter is in the true vertical position, an electric circuit including said energizable means, and a plurality of pairs of contact elements in said circuit operatively associated with said member so that the contacts of each pair move relative to one another in accordance with the degree and direction of angular displacement of the spin axis of the rotor assembly from the true vertical position, all of said pairs of contact elements cooperatively inter-engaging to close said circuit and energize said energizable means only when the spin axis of the rotor assembly is within a predetermined limited range of angular displacement from the true vertical position.

5. In a gyro device of the charater described, a rotor assembly having a normally vertical spin axis and mounted for angular movement about two mutually perpendicular horizontal axes at right angles to the rotor spin axis, a member pivotally mounted with respect to said rotor assembly and arranged for disposition in the true vertical position independently of the position of the rotor spin axis, a magnetic core element associated with the rotor assembly and arranged axially of the spin axis of the rotor, erecting means cooperable with said core member including a permanent magnet device and an electro-magnet device coaxially disposed and carried by said member and arranged so that the common axis of said magnet devices is disposed coaxially of the rotor spin axis when the latter is in the true vertical position, said electro-magnet device when energized exerting a substantially stronger attractive force on said core element than said permanent magnet device, an electric circuit including said electro-magnet device, and a plurality of pairs of contact elements in said circuit operatively associated with said member so that the contacts of each pair move relative to one another in accordance with the degree and direction of angular displacement of the spin axis of the rotor assembly from the true vertical position, all of said pairs of contact elements cooperatively inter-engaging to close said circuit and energize said energizable means only when the spin axis of the rotor assembly is within a predetermined limited range of angular displacement from the true vertical position.

6. In a gyro device of the character described, a rotor assembly mounted to spin about a normally vertical axis, supporting means mounting said rotor for angular movement about two mutually perpendicular horizontal axes at right angles to the rotor spin axis, a suspended pendulum pivoted to said rotor assembly for angular movement about an axis parallel to one horizontal axis of angular movement of the rotor assembly and arranged so that said pendulum is disposed in the true vertical position independently of the position of the rotor spin axis, a magnetic core element associated with said rotor assembly and arranged coaxially of the spin axis of the rotor, erecting means cooperable with said core element including an electro-magnet device carried by said pendulum and arranged so that its axis is disposed coaxially of the rotor spin axis when the latter is in the true vertical position, an electric circuit including said electro-magnet device, and contact elements in said circuit cooperable only when the spin axis of the latter is within a predetermined limited range of angular displacement in any direction from the true vertical position to thereby close said circuit and energize said electro-magnet device to erect said rotor assembly accurately into the true vertical position.

7. In a gyro device of the character described, a rotor assembly mounted to spin about a normally vertical axis, supporting means mounting said rotor for angular movement about two mutually perpendicular horizontal axes at right angles to the rotor spin axis, a suspension pivoted to said rotor assembly for angular movement about an axis parallel to one horizontal axis of angular movement of the rotor assembly, a pendulum pivotally carried by said suspension and arranged for angular movement about an axis parallel to the other horizontal axis of angular movement of the rotor assembly and arranged so that said pendulum is disposed in the true vertical position independently of the position of the rotor spin axis, a magnetic core element associated with said rotor assembly and arranged coaxially of the spin axis of the rotor, erecting means cooperable with said core member including an electro-magnet device carried by said pendulum and arranged so that its axis is disposed coaxially of the rotor spin axis when the latter is in the true vertical position, and an electric circuit including said electro-magnet device.

8. In a gyro device of the character described, a rotor assembly mounted to spin about a normally vertical axis, supporting means mounting said rotor for angular movement about two mutually perpendicular horizontal axes at right angles to the rotor spin axis, a suspension pivoted to said rotor assembly for angular movement about a horizontal axis parallel to one horizontal axis of angular movement of the rotor assembly, a pendulum pivotally carried by said suspension and arranged for angular movement about an axis parallel to the other horizontal axis of angular movement of the rotor assembly and arranged so that said pendulum is disposed in the true vertical position independently of the position of the rotor spin axis, a magnetic core element associated with said rotor assembly and arranged coaxially of the spin axis of the rotor, erecting means cooperable with said core member including a permanent magnet device and an electro-magnet device coaxially disposed and carried by said pendulum and arranged therein so that their common axis is disposed coaxially of the rotor spin axis when the latter is in the true vertical position, an electric circuit including said electro-magnet device, and contact elements in said circuit cooperable only when the spin axis of the rotor is within a predetermined limited range of angular displacement in any direction from the true vertical position to thereby close said circuit and energize said electro-magnet to erect said rotor assembly accurately into the true vertical position.

9. In a gyro device of the character described, a rotor assembly mounted to spin about a normally vertical axis, supporting means mounting said rotor for angular movement about two mutually perpendicular horizontal axes at right angles to the rotor spin axis, a suspension pivoted to said rotor assembly for angular movement about a horizontal axis parallel to one horizontal axis of angular movement of the rotor assembly, a pendulum pivotally carried by said suspension and arranged for angular movement about an axis parallel to the other horizontal axis of angular movement of the rotor assembly and arranged so that said pendulum is disposed in true vertical position independently of the position of the rotor spin axis, a magnetic core element associated with said rotor assembly and arranged coaxially of the spin axis of the rotor, erecting means cooperable with said core member including a permanent magnet device and an electro-magnet device coaxially disposed and carried by said pendulum and arranged therein so that their common axis is disposed coaxially of the rotor spin axis when the latter is in the true vertical position, said electro-magnet device when energized having a comparatively stronger attractive force than said permanent magnet, an electric circuit including said electro-magnet device, and a plurality of pairs of contacts in said circuits cooperable when the spin axis of the latter is within a predetermined limited range of angular displacement in any direction from the true vertical position to close said circuit and energize said electro-magnet to accurately erect said rotor assembly.

10. In a gyro device of the character described, a rotor assembly mounted to spin about a normally vertical axis, supporting means mounting said rotor for angular movement about two mutually perpendicular horizontal axes at right angles to the rotor spin axis, a suspension pivoted to said rotor assembly for angular movement about an axis parallel to one horizontal axis of angular movement of the rotor assembly a pendulum pivotally carried by said suspension and arranged for angular movement about an axis parallel to the other horizontal axis of angular movement of the rotor assembly and arranged so that said pendulum is disposed in the true vertical position independently of the position of the rotor spin axis, a magnetic core element associated with said rotor assembly and arranged coaxially of the spin axis of the rotor, erecting means cooperable with said core member including an electro-magnet device carried by said pendulum and arranged therein so that the axis of said electro-magnet device is disposed coaxially of the rotor spin axis when the latter is in the true vertical position, an electric circuit including said electro-magnet device, and a plurality of pairs of contact elements in said circuit operatively associated with said member so that the contacts of each pair move relative to one another in accordance with the degree and direction of angular displacement of the spin axis of the rotor assembly from the true vertical position, all of said pairs of contact elements cooperatively inter-engaging to close said circuit and energize said energizable means only when the spin axis of the rotor assembly is within a predetermined limited range of angular displacement from the true vertical position.

11. In a gyro device of the character described, a rotor assembly mounted to spin about a normally vertical axis, supporting means mounting said rotor for angular movement about two mutually perpendicular horizontal axes at right angles to the rotor spin axis, a suspension pivoted to said rotor assembly for angular movement about a horizontal axis parallel to one horizontal axis of angular movement of the rotor assembly, a pendulum pivotally carried by said suspension and arranged for angular movement about an axis parallel to the other horizontal axis of angular movement of the rotor assembly and arranged so that said pendulum is disposed in true vertical position independently of the position of the rotor spin axis, a magnetic core element associated with said rotor assembly and arranged coaxially of the spin axis of the rotor, erecting means cooperable with said core member including a permanent magnet device and an electro-magnet device coaxially disposed and carried by said pendulum and arranged therein so that the common axis of said magnet devices is disposed coaxially of the rotor spin axis when the latter is in the true vertical position, said electro-magnet device when energized having a comparatively stronger attractive force than said permanent magnet, an electric circuit including said electro-magnet device, and a plurality of pairs of contact elements operatively associated with said member so that the contacts of each pair move relative to one another in accordance with the edgree and direction of angular displacement of the spin axis of the rotor assembly from the true vertical position, all of said pairs of contact elements cooperatively inter-engaging to close said circuit and energize said energizable means only when the spin axis of the rotor assembly is within a predetermined limited range of angular displacement from the true vertical position.

ALEXANDER RUSS.

REFERENCES CITED

The following references are of record in the file of this patent:

UNITED STATES PATENTS

| Number | Name | Date |
|---|---|---|
| 2,238,645 | Horn | Apr. 15, 1941 |
| 2,297,265 | Von Manteuffel | Sept. 29, 1942 |
| 2,339,606 | Sias | Jan. 18, 1944 |

FOREIGN PATENTS

| Number | Country | Date |
|---|---|---|
| 291,047 | Great Britain | Mar. 19, 1928 |
| 359,071 | Great Britain | Mar. 6, 1931 |